US011982656B2

(12) United States Patent
Jeglinski et al.

(10) Patent No.: US 11,982,656 B2
(45) Date of Patent: May 14, 2024

(54) METHOD OF CONTROL OF A SPECTROMETER

(71) Applicant: Thermo Fisher Scientific (Bremen) GmbH, Bremen (DE)

(72) Inventors: Holger Jeglinski, Bremen (DE); Frank-Torsten Heine, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 17/469,720

(22) Filed: Sep. 8, 2021

(65) Prior Publication Data
US 2022/0082539 A1 Mar. 17, 2022

(30) Foreign Application Priority Data
Sep. 11, 2020 (GB) ........................... 2014356

(51) Int. Cl.
| | |
|---|---|
| *G01N 30/00* | (2006.01) |
| *G01N 30/72* | (2006.01) |
| *G01N 30/86* | (2006.01) |
| *H01J 49/00* | (2006.01) |
| *H01J 49/02* | (2006.01) |

(52) U.S. Cl.
CPC ..... *G01N 30/8637* (2013.01); *G01N 30/7206* (2013.01); *H01J 49/0031* (2013.01); *H01J 49/0036* (2013.01); *H01J 49/025* (2013.01)

(58) Field of Classification Search
CPC ............ G01N 30/8637; G01N 30/7206; H01J 49/0031; H01J 49/0036; H01J 49/025; H01J 49/0027; H01J 49/00
USPC ........................................ 250/281, 282, 288
See application file for complete search history.

(56) References Cited

U.S. PATENT DOCUMENTS

| | | | |
|---|---|---|---|
| 2003/0155497 A1* | 8/2003 | Kato | ..................... H01J 49/165 |
| | | | 250/281 |
| 2008/0265152 A1 | 10/2008 | Bateman | |

FOREIGN PATENT DOCUMENTS

WO    2006125863 A1    11/2006

OTHER PUBLICATIONS

Combined Search and Examination Report dated Jul. 8, 2021, to GB Patent Application No. 2014356.6.

* cited by examiner

*Primary Examiner* — Michael Maskell

(57) ABSTRACT

A method for controlling a mass spectrometer comprising a mass analyser and a detector. A test specimen is supplied into the mass analyser, to travel through the mass analyser and towards the detector, the test specimen comprising a carrier gas and/or analyte ions, the test specimen being one of a series of test specimens to be analysed. An ion intensity is measured, the ion intensity representing the intensity of ions within the test specimen received at the detector. The method determines if at least one validity criterion of a group of validity criteria is complied with, the group of validity criteria including: identification of a valid peak in the ion intensity measured within a predetermined time interval; and identification of a user-specified flag associated with the predetermined time interval. If none of the validity criteria are complied with, then terminating supplying into the mass analyser the test specimen and any further test specimen of the series of test specimens. A controller configured to carry out the method, and a mass spectrometer are also disclosed.

20 Claims, 10 Drawing Sheets

| Detection Parameter | |
|---|---|
| Start Slope [mV/s] | 0.2 |
| End Slope [mV/s] | 0.4 |
| Peak Min Height [mV] | 50 |
| Peak Resolution [%] | 50 |
| Max Peak Width [s] | 180 |

FIGURE 8

METHOD OF CONTROL OF A SPECTROMETER

CROSS-REFERENCE TO RELATED APPLICATIONS

This application claims priority to UK Patent Application No. 2014356.6, filed Sep. 11, 2020, and entitled "Method of control of a spectrometer," which is incorporated by reference in its entirety in this disclosure.

TECHNICAL FIELD

This invention relates to a method of controlling a mass spectrometer, particularly an isotope ratio mass spectrometer (IRMS) used in conjunction with a combustion or pyrolysis device and a liquid or gas chromatograph. More particularly, the invention relates to a method for detecting valid or invalid characteristics of a measurement of an analyte or a sample in an IRMS system, in order to control the continuation or termination of a measurement.

BACKGROUND TO THE INVENTION

Isotope Ratio Mass Spectrometry (IRMS) is a technique that finds application across many fields including geosciences, archaeology, medicine, geology, biology, food authenticity and forensic science. Accurate and precise measurement of variations in the abundances of isotopic ratios of light elements in a sample such as $^{13}C/^{12}C$ ($\delta^{13}C$), $^{15}N/^{14}N$ ($\delta^{15}N$), $^{18}O/^{16}O$ ($\delta^{18}O$), D/H, and $^{34}S/^{32}S$ ($\delta^{34}S$), relative to an isotopic standard, can provide information on the geographical, chemical and biological origins of substances, allowing differentiation between samples that are otherwise chemically identical.

IRMS requires the combustion and pyrolysis of a sample in a reactor, which is purged by a carrier gas. After the combustion or pyrolysis, the carrier gas conveys the sample (converted to a gas or liquid phase) to a chromatograph. The chromatograph provides separation of certain components (atoms, molecules, or smaller compounds) within the sample. After passing through the chromatograph, the carrier gas conveys the separated sample into a mass spectrometer, where sample ions are spatially separated according to their mass-to-charge ratios. The sample ions are then detected by an array of detectors.

The types of samples tested using IRMS are often valuable and rare. As such, the amount of sample available for multiple, sequential analyses may be limited. Similarly, the carrier gases used are often also expensive. As such, the avoidance of the wastage of samples and carrier gas caused by undertaking invalid measurements is highly desirable. Moreover, invalid measurements also cause inconvenience and inefficiency for the operator or user of the system.

Invalid measurements may take place if one or more of the various elements of an IRMS system suffers a fault or blockage, or if the sample fails to be properly introduced into the system. Typically, invalid measurements in an IRMS are a result of either: the pyrolysis gas not being generated (reactor failure), or not being transported into the gas chromatograph (carrier gas failure, leakage, blockage, etc.). However, due to the closed nature of an IRMS system, it can be difficult for an operator to identify that an error has occurred during a measurement, at least until an amount of time has passed and a portion of sample and/or carrier gas has already been wasted. Moreover, an operator must continuously monitor a measurement sequence (which may include a number of sequential measurements without pause), to determine if a measurement is continuing correctly.

US Patent publication no. US 2003/155497 describes a electrospray ionization mass analysis apparatus and its system. In this system, a sample solution from a chromatograph is introduced into a capillary tube, and an electrospray ion source generates ions, which are led into a mass spectrometer disposed in a vacuum chamber where the ion is subjected to mass analysis. The current value or the intensity of the ion having a specified mass in the sample solution is measured, and, when the current value reduces below a threshold value, an error state is displayed. The error state may be denoted by a flag added by a controller after determination that the current has reduced below the threshold value. However, this system cannot distinguish between different sample types such as blanks, standards and unknowns. Furthermore, comparison of raw and unfiltered data against a threshold can only provide rudimentary identification of a valid sample measurement.

In view of this, the present invention seeks to address these challenges by providing a method for control of a mass spectrometer, and more specifically an isotope ratio mass spectrometer (IRMS) system. A controller for a mass spectrometer is also described. It is one of the objects of the invention to automatically identify an invalid measurement, so that the measurement accordingly may be continued or terminated thereby reducing unnecessary wastage of a sample and/or carrier gas.

BRIEF SUMMARY OF THE INVENTION

The following presents a simplified summary of various aspects described herein. This summary is not an extensive overview, and is not intended to identify key or critical elements. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a method for controlling a mass spectrometer comprising a mass analyser and a detector. The method may comprise supplying a test specimen into the mass analyser, to travel through the mass analyser and towards the detector, the test specimen comprising a carrier gas and/or analyte ions, the test specimen being one of a series of test specimens to be analysed. The ion intensity may be measured, the ion intensity representing the intensity of ions within the test specimen received at the detector, and it may be determined if at least one validity criterion of a group of validity criteria is complied with. The group of validity criteria may consist of: identification of a valid peak in the ion intensity measured within a predetermined time interval; and identification of a user-specified flag associated with the predetermined time interval. If none of the validity criteria are complied with, then the supplying into the mass analyser of the test specimen and any further test specimen of the series of test specimens may be terminated.

According to additional aspects, identification of a valid peak in the ion intensity measured within the predetermined time interval may comprise detecting a peak in the ion intensity measured within the predetermined time interval. According to further aspects, the detected peak may be a valid peak if the detected peak has a maximum that exceeds a predetermined peak maximum threshold. The detected peak may be a valid peak if the detected peak has a start and end of the peak within the predefined time interval. The detected peak may be a valid peak if the detected peak has a width that is greater than a minimum threshold width, and less than a maximum threshold width. The detected peak may be a valid peak if the detected peak has an area under the peak that is between a predetermined upper area threshold and a predetermined lower area threshold. In some embodiments, the area under the peak may be used to determine peak shape. According to further aspects, detecting the peak may comprise determining of a positive slope in the ion intensity measured within the predetermined time interval, the positive slope having a gradient of greater than a positive gradient threshold for at least a first time period, and determining of a negative slope in the ion intensity measured within the predetermined time interval, the negative slope having a gradient less than a negative gradient threshold for at least a second time period, subsequent to the first time period.

In accordance with one or more aspects, the user-specified flag may indicate that, although the ion intensity is measured during the predetermined interval, the supplying of the test specimen (or any further test specimen) into the mass analyser should not be terminated regardless of the presence or absence of a peak in the ion intensity measured within the predetermined time interval. The user-specified flag may be applied by the user or operator of the apparatus prior to the predetermined time interval.

In accordance with one or more aspects, prior to determining if at least one validity criterion is complied with, the method may further comprise applying a smoothing algorithm to the measurement of the ion intensity.

In some embodiments, terminating supplying into the mass analyser the test specimen and any further test specimen of the series of test specimens may comprise at least one of a group comprising: preventing input of the test specimen and any further test specimen of the series of test specimens to the mass analyser; ceasing a supply of the carrier gas; ceasing a supply of the analyte ions; placing into standby a sample introduction system that is fluidly connected to the mass analyser, and arranged to introduce an analyte; and placing the mass analyser into standby.

In some embodiments, the method may comprise passing the carrier gas and/or analyte through a chromatograph prior to supplying the test specimen into the mass analyser.

In some embodiments, the predetermined time interval may begin after elapse of a time period associated with the expected time for a component of a sample to travel between a sample source and the detector, the sample component being ionised to generate the analyte ions prior to being supplied into the mass analyser.

In accordance with one or more aspects, the mass spectrometer may be an isotope ratio mass spectrometer. The mass spectrometer may comprise a plurality of detectors, arranged in a detector array. Each of the plurality of detectors may be a Faraday collector or any suitable detector. Measuring an ion intensity may comprise measuring an ion intensity at each detector of the plurality of detectors, and wherein determining if the measurement of the ion intensity complies with at least one validity criterion of the group of validity criteria may comprise determining, for the measurement of the ion intensity at each detector of the plurality of detectors, if the measurement of the ion intensity complies with at least one validity criterion of the group of validity criteria. If, in the measurement of the ion intensity at each and every detector of the plurality of detectors, none of the validity criteria are complied with, then supplying into the mass analyser the test specimen and any further test specimen of the series of test specimens may be terminated.

In accordance with other aspects, there is a controller for connecting to a mass spectrometer, and a mass spectrometer comprising the controller described.

These and additional aspects will be appreciated with the benefit of the disclosures discussed in further detail below.

BRIEF DESCRIPTION OF THE DRAWINGS

The present invention will now be described, by way of example only, with reference to the accompanying drawings. A more complete understanding of aspects described herein and the advantages thereof may be acquired by referring to the following description in consideration of the accompanying drawings, wherein:

FIG. 8 is an image of a graphical user interface for allowing a user to specify the values for parameters defining various conditions for a valid detected peak;

In the drawings, like parts are denoted by like reference numerals. The drawings are not drawn to scale.

DETAILED DESCRIPTION OF THE DRAWINGS

Figure 1:
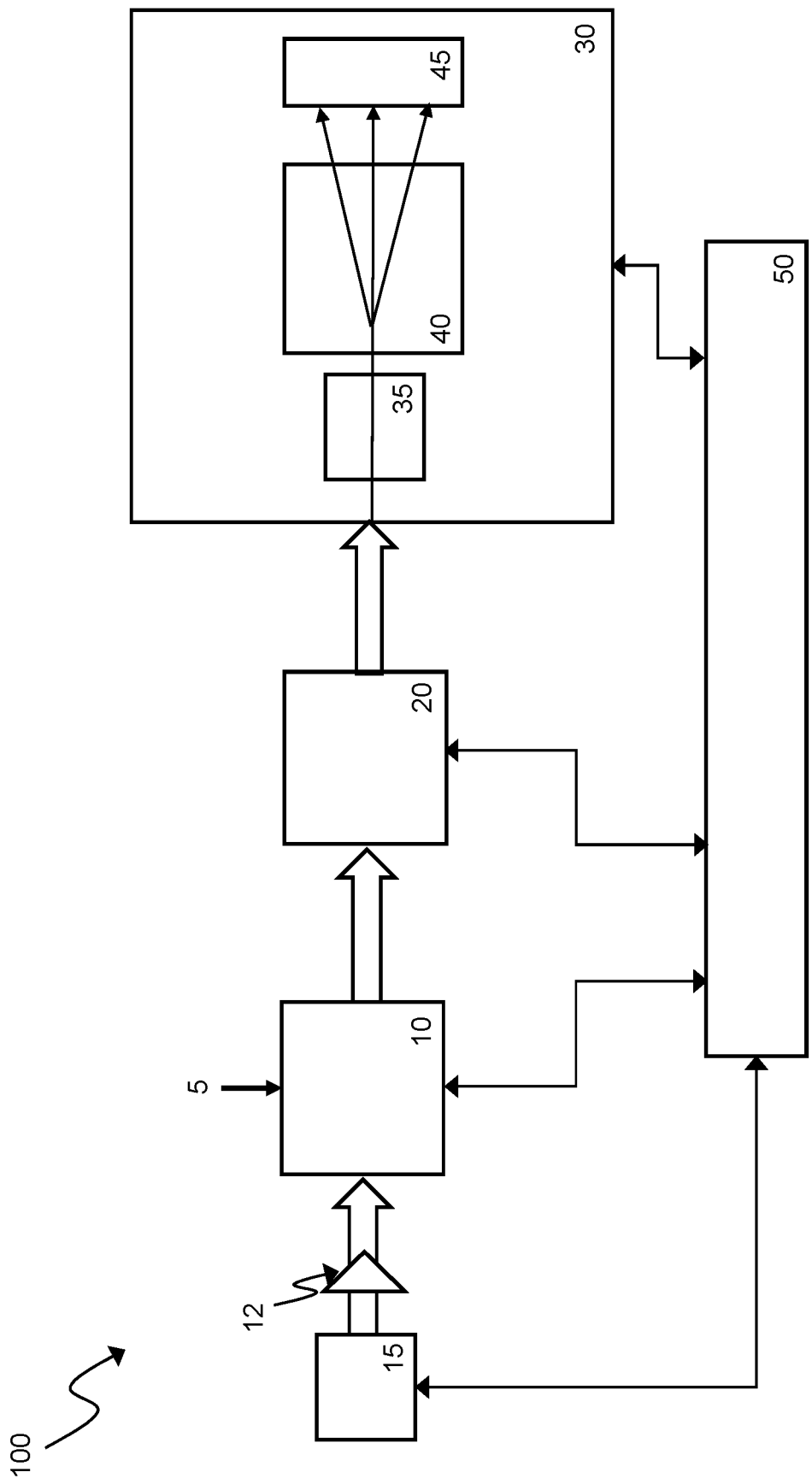
FIG. 1 is a schematic representation of a system for isotope ratio mass spectrometry (IRMS)

There is described a method and a controller for a mass spectrometer, preferably an isotope ratio mass spectrometer. The controller is configured to control the steps of the described method. The method looks to identify validity criteria within a measurement of ion intensity at the mass spectrometer. If at least one of the validity criteria is met, then the measurement may continue (for example, by proceeding to measure one or more further samples). However, if none of the validity criteria are met, then the measurement is terminated. More specifically, the supply of the analyte and/or carrier gases are terminated, in order to prevent wastage of these substances as part of invalid or erroneous measurements.

A first validity criterion is the detection of a valid peak within the measurement of the ion intensity within the time period. A valid peak may be identified via one or more measureable characteristics such as peak height, peak width, area under the peak, and peak shape.

A second validity criterion is the identification of a user-specified flag associated with a given measurement of the ion intensity within a certain time period. In an example, the user-specified flag indicates that the measurement of ion intensity is a 'blank' measurement. The user-specified flag is a pre-applied, or predefined, flag, indicator or label, which can be applied by a user via a controller (or automatically by a controller, on the basis of other instructions provided to the controller) prior to the commencement of a measurement (in other words, before the given time period). The flag indicates to the controller that no action should be taken to terminate the measurement (or to terminate the supply into the mass analyser of the test specimen), irrespective of the presence or absence of a peak in the measurement of the ion intensity within the time period. In other words, the flag gives a prior indication to the controller that the measurement within a particular time period is intended by a user to be a 'blank' or control measurement, for instance to provide a measure of background contaminants. In some cases, the flag may indicate that an ion intensity is not measured during the predetermined time interval. Alternatively, although the ion intensity is measured during the predetermined time interval, irrespective of the presence or absence of a peak in the ion intensity then the supply into the mass analyser of the test specimen is allowed to continue.

In an embodiment described herein, there is a method for controlling a mass spectrometer comprising a mass analyser and a detector, the method comprising:

supplying a test specimen into the mass analyser, to travel through the mass analyser and towards the detector, the test specimen comprising a carrier gas and/or analyte ions, the test specimen being one of a series of test specimens to be analysed;

measuring an ion intensity, the ion intensity representing the intensity of ions within the test specimen received at the detector;

determining if at least one validity criterion of a group of validity criteria is complied with, the group of validity criteria consisting of:

identification of a valid peak in the ion intensity measured within a predetermined time interval; and identification of a user-specified flag associated with the predetermined time interval; and if none of the validity criteria are complied with, then terminating supplying into the mass analyser the test specimen and any further test specimen of the series of test specimens.

The mass spectrometer may be an isotope-ratio mass spectrometer.

The test specimen includes any substance or chemical component to be analysed via the mass analyser. As such the test specimen may include the carrier gas together with a sample or reference analyte, or in a 'blank' measurement may comprise only the carrier gas and any contaminants inherent in the system. In the present description, an analyte is considered to be any substance or chemical constituent of interest (in other words, for analysis in the mass analyser).

The test specimen is one of a series of test specimens to be analysed. In particular, the test specimen may be one of a plurality of test specimens in a pre-programmed sequence of test specimens to be measured. Each test specimen in the series of test specimens may be identical (in other words, a repeated measurement of the same carrier gas and/or analyte), or at least some of the test specimens in the series may be different (for instance, a first test specimen comprising carrier gas and a sample analyte, a second test specimen comprising carrier gas and a reference analyte, a third test specimen comprising carrier gas and any inherent contaminants only (i.e. a 'blank' measurement), and a fourth test specimen comprising carrier gas and the sample analyte). The test specimens may be programmed (or 'queued') to automatically be measured in sequence, unless the sequence is terminated. In the described method, the sequence may be terminated if, for a given test specimen in the series of test specimens, none of the validity criteria are complied with in the ion intensity measured within a predetermined time interval. Each test specimen is associated with a particular predetermined time interval (as discussed further below).

Supplying a test specimen may be controlled by regulation of a carrier gas supply, control of a sample introduction or preparation system, and/or regulation of one or more valves throughout the system of which the mass spectrometer forms a part. In this way, a measurement is initiated by introduction of the test specimen into the mass analyser.

A measurement of ion intensity received at a detector within a predetermined time interval is analysed to determine if certain validity criteria are met. If at least one criterion is met, the measurement may continue, otherwise the measurement is terminated. The predetermined time interval describes a portion of the measurement of the ion intensity, during which the ions of a particular analyte may be expected to be received at the detector. The predetermined time interval is identified based on the expected amount of time for an analyte to travel between a sample introduction system and the detector of the mass spectrometer. This amount of time will be characteristic for a given ion species, and will be known for a given system according to previous measurements.

Each test specimen of the series of test specimens is associated with a particular predetermined time interval. For each test specimen there is a window or interval within the ion intensity measured from the introduction of the given test specimen to the system, in which peaks would expect to be seen (for a measurement of a sample or reference analyte) or to be used for calibration (for a 'blank' measurement). The predetermined time interval may be the same for each test specimen in a series, and begin after the same amount of time has elapsed since introduction of the given test specimen, but this is not necessarily the case.

A first validity criterion is the identification of a valid peak in the ion intensity measured within a predetermined time interval, as discussed further below. A second validity criterion is identification of a user-specified flag associated with the predetermined time interval. In some examples, the second validity criterion may be identification of a user-specified flag associated with the ion intensity measured within the predetermined time interval. The user-specified flag can indicate that no ion intensity measurement should be made during the predetermined time interval, or more commonly that, although the ion intensity measurement takes place within the predetermined time interval, the user-specified flag indicates to the controller that the supply of the test specimen (or the subsequent test specimen) should continue, whether or not a peak is identified in the ion intensity measured within the predetermined time interval.

Terminating supplying the test specimen and any further test specimen of the series of test specimens may be any action that stops or suspends the measurement, including ceasing of a carrier gas supply, placing a sample introduction or preparation system into standby mode, and/or closure of one or more valves throughout the system of which the mass spectrometer forms a part. The primary intention of the termination of the supply of the test specimen and any further test specimen is to prevent wastage of the carrier gas and/or analyte. Therefore, the action to terminate may comprise stopping the flow of a carrier gas, the containment of a sample and/or the stopping of pyrolysis or combustion of a sample (if within an IRMS system).

Beneficially, the described method identifies a measurement that appears to be erroneous, thus indicating a fault or error in the measurement or measurement system. The method provides an efficient, real-time mechanism for stopping erroneous measurements (and in particular, stopping completion of a full series of erroneous measurements) without operator input, and so allowing a measurement to proceed without constant supervision from an operator of the apparatus. As such, measurements can be effected more efficiently, with minimal wastage of carrier gases and/or analytes (samples or reference) comprised within a test specimen.

Preferably, identification of a valid peak in the ion intensity measured within the predetermined time interval comprises detecting a peak in the ion intensity measured within the predetermined time interval. As an analyte ion species would be expected to be received at the detector within the predetermined time interval, lack of detection of a peak within this interval provides a reliable indicator of an error in the measurement.

Preferably, the detected peak is a valid peak if the detected peak has a maximum that exceeds a predetermined peak maximum threshold. In other words, the detected peak must exceed a predetermined threshold peak height.

Preferably, the detected peak is a valid peak if the detected peak has a start and end of the peak within the predefined time interval. In this example, the whole width of the peak must be within the predefined time interval.

Preferably, the start of the peak is the position within the rise of the peak at 40% of the peak maximum, and the end of the peak is the position within the fall of the peak at 40% of the peak maximum. The 'whole' width of the peak may be defined as a portion of the peak between a point on each of the rise and fall of the peak. Those points may be defined as a percentage of the peak height. In alternative examples, the percentage of the peak height denoting the start and end of the peak may be a 5%, 10%, 20%, 25%, 30%, 40%, 50% or 60% of the peak maximum.

Preferably, the detected peak is a valid peak if the detected peak has a width that is greater than a minimum threshold width, and less than a maximum threshold width. This condition may prevent peaks of irregular shapes (such as narrow 'spikes' in the data due to noise) being identified as valid peaks.

Preferably, the detected peak is a valid peak if the detected peak has an area under the peak that is between a predetermined upper area threshold and a predetermined lower area threshold. The area under the peak may be a useful measure if the shape of the peak is variable between valid measurements.

Optionally, the area under the peak may be used to determine peak shape, for instance. In an example, the detected peak is a valid peak if the detected peak has a ratio of peak height:peak width:area under peak that is within a predefined range.

Preferably, detecting the peak comprises determining of a positive slope in the ion intensity measured within the predetermined time interval, the positive slope having a gradient of greater than a positive gradient threshold for at least a first time period, and determining of a negative slope in the ion intensity measured within the predetermined time interval, the negative slope having a gradient less than a negative gradient threshold for at least a second time period, subsequent to the first time period. Detecting the peak may make use of any reasonable peak detection algorithm.

Preferably, the user-specified flag indicates that, although the ion intensity is measured during the predetermined interval, the supplying of the test specimen (or any further test specimen) into the mass analyser should not be terminated regardless of the presence or absence of a peak in the ion intensity measured within the predetermined time interval. The user-specified flag may indicate a 'blank' measurement (in other words, a measurement in which no analyte is specifically added to the test specimen). The user may apply the user-specified flag prior to a 'blank' measurement being made, in order to instruct that the presence or absence of peaks in the predetermined time interval should be ignored. In other words, the user-specified flag indicates that the supplying of the test specimen (or any further test specimen) into the mass analyser should not be terminated regardless of the magnitude of the ion intensity measured within the predetermined time interval. The user-specified flag as a validly criterion allows one or more 'blank' measurements to be interspersed within a sequence of analyte measurements, without intervention from an operator, whilst also without triggering termination of the measurement due to a lack of valid peak.

Alternatively, the user specified flag indicates that the ion intensity should not be measured during the predetermined interval, and that the supplying of the test specimen (or any further test specimen) into the mass analyser should not be terminated.

Preferably, the user-specified flag is applied by the user or operator of the apparatus prior to the predetermined time interval. The user specified flag is applied prior to a measurement of the ion intensity during the predetermined interval, and may be applied prior to the test specimen being supplied to the mass analyser. Where a sequence of measurements are made (of a series of test specimens), one or more measurement within the sequence may be identified as 'blank' measurement prior to commencement of the measurement sequence.

Preferably, prior to determining if at least one validity criterion is complied with, the method further comprises applying a smoothing algorithm to the measurement of the ion intensity. Application of a smoothing algorithm allows the underlying trends within the measured ion intensity to be identified, without false detection of peaks as a result of noise within the measurement. The smoothing algorithm is chosen in order to reduce or remove high frequency fluctuation in the ion intensity as a result of noise. Use of a smoothing algorithm may reduce the number of 'false positives' for identification of a valid peak.

Preferably, the smoothing algorithm is a Savitzky-Golay filter. Use of the Savitzky-Golay filter as a smoothing algorithm may be beneficial because it avoids the smoothed ion intensity measurement being shifted on the time axis. As such, the features identified within the smoothed data should be present (or otherwise) at the 'true' time associated with measurement of the ions at the detector. As such, any valid peak in the smoothed measured ion intensity should appear within the predetermined time interval, without adjustment. More information on the Savitzky-Golay filter can be found at https://en.wikipedia.org/wiki/Savitzky%E2%80%93Golay_filter (accessed 11 Sep. 2020).

Alternatively, another smoothing algorithm could be used. For instance, a moving (or rolling) average could be used, which provides a mean average over a set of sequential data points of the ion intensity measurement. In an example, the moving average could provide an average over the last 3 data points, the last 10 data points, or the last 100 data points. The moving average could be calculated over any number of data points between 3 and 200. As a further alternative, other types of smoothing algorithm (or smoothing filter) may be used (for instance, bin smoothing, local or global running line smoothing, or kernel density smoothing). Any smoothing algorithm suitable for identifying the underlying trends in noisy data could be used.

Preferably, terminating supplying into the mass analyser the test specimen and any further test specimen of the series of test specimens, comprises at least one of a group comprising:

preventing input of the test specimen and any further test specimen of the series of test specimens to the mass analyser;
ceasing a supply of the carrier gas;
ceasing a supply of the analyte ions;
placing into standby a sample introduction system that is fluidly connected to the mass analyser, and arranged to introduce an analyte; and
placing the mass analyser into standby.

Terminating the supply may comprise any action which reduces or prevents flow of the analyte or carrier gas through the system, and/or the combustion or pyrolysis of the sample analyte or reference analyte, thereby preserving the carrier gas and/or analyte from wastage. Terminating the supply may comprise any action to place the sample introduction, the sample preparation or the mass spectrometer stage of an IRMS system into standby. Terminating the supply may further comprise any action to prevent introduction of a further analyte into the system.

In particular, preventing input of the test specimen (or any further test specimen) to the mass analyser may comprise placing into standby peripheral apparatus, connected prior to the mass analyser. For instance, this may include stopping and/or placing into standby an autosampler arranged to introduce samples or reference samples for analysis. Preventing input of the test specimen to the mass analyser may include any action to prevent a new sample or further test specimen being introduced into the mass spectrometer apparatus, and so the mass analyser, at least until further user input is received.

Preferably, the method further comprises passing the carrier gas and/or analyte through a chromatograph prior to supplying the test specimen into the mass analyser. In an IRMS system, an analyte is separated into atoms, molecules or components of interest by chromatography, prior to entrance to the mass spectrometer.

Preferably, the predetermined time interval begins after elapse of a time period associated with the expected time for a component of a sample to travel between a sample source and the detector, the sample component being ionised to generate the analyte ions prior to being supplied into the mass analyser. In other words, the predetermined time interval begins after elapse of an amount of time expected for a sample to travel from a sample source to a detector. The expected travel time can be established by previous measurements of a given analyte at a given system. Different analytes will be associated with different travel times. As such, where an array of detectors is used at the mass spectrometer, each to collect different ion species, different predetermined time intervals may be associated with the measurement received from different detectors of the detector array. Moreover, each test specimen of the series of test specimens will be associated with a particular predetermined time interval.

Preferably, the mass spectrometer is an isotope ratio mass spectrometer.

Preferably, the mass spectrometer comprises a plurality of detectors, arranged in a detector array. However, in an alternative, a single detector may be used.

Preferably, each of the plurality of detectors is a Faraday collector. However, any suitable detector which measures received ion intensity as a function of time may be used.

Preferably, measuring an ion intensity comprises measuring an ion intensity at each detector of the plurality of detectors, and wherein determining if the measurement of the ion intensity complies with at least one validity criterion of the group of validity criteria comprises determining, for the measurement of the ion intensity at each detector of the plurality of detectors, if the measurement of the ion intensity complies with at least one validity criterion of the group of validity criteria; and if, in the measurement of the ion intensity at each and every detector of the plurality of detectors, none of the validity criteria are complied with, then terminating supplying into the mass analyser the test specimen and any further test specimen of the series of test specimens.

In other words, for a given test specimen, where an array of detectors is used at the mass spectrometer, identification that at least one validity criterion is met in a measurement received from any one detector of the detector array will be sufficient to allow the measurement (and supply of the test specimen and any further test specimen) to proceed. In an alternative, the measurement may be terminated if, for a given test specimen, none of the validity criteria are met in the measurement received from a predefined proportion of the detectors (or from specific detectors in the array), or if, in the measurement received from every one of the detectors within the array, none of the validity criteria are met.

Further, there is described herein a controller for connecting to a mass spectrometer comprising a mass analyser and a detector, the controller configured to:

supply a test specimen into the mass analyser, to travel through the mass analyser and towards the detector, the test specimen comprising a carrier gas and/or analyte ions, the test specimen being one of a series of test specimens to be analysed;

receive a measurement of an ion intensity, the ion intensity representing the intensity of ions within the test specimen received at the detector;

determine if the measurement of the ion intensity complies with at least one validity criterion of a group of validity criteria consisting of:

identification of a valid peak in the ion intensity measured within a predetermined time interval; and
identification of a user-specified flag associated with the ion intensity measured within the predetermined time interval; and if none of the validity criteria are complied with, then the controller configured to terminate supply into the mass analyser of the test specimen and any further test specimen of the series of test specimens.

Preferably, identification of a valid peak in the ion intensity measured within the predetermined time interval comprises detection of a peak in the ion intensity measured within the predetermined time interval.

Optionally, the detected peak is a valid peak if the detected peak has a maximum that exceeds a predetermined peak maximum threshold.

Optionally, the detected peak is a valid peak if the detected peak has a start and end of the peak within the predefined time interval.

In some examples, the start of the peak is the position within the rise of the peak at a predefined percentage of the peak maximum, and the end of the peak is the position within the fall of the peak at the same predefined percentage of the peak maximum. Various percentages could be used as the predefined percentage (including 5%, 10%, 12%, 25%, 30%, 40%, or 50%).

Optionally, the detected peak is a valid peak if the detected peak has an area under the peak that is between a predetermined upper area threshold and a predetermined lower area threshold.

Preferably, detection of the peak comprises determination of a positive slope in the ion intensity measured within the predetermined time interval, the positive slope having a gradient of greater than a positive gradient threshold for at least a first time period, and determination of a negative slope in the ion intensity measured within the predetermined time interval, the negative slope having a gradient less than a negative gradient threshold for at least a second time period, subsequent to the first time period.

Preferably, the user-specified flag indicates that supply of the test specimen or further test specimen of the series of test specimens into the mass analyser should not be terminated regardless of the presence or absence of a peak in the ion intensity measured within the predetermined time interval.

Preferably, the user-specified flag is applied by the user prior to the predetermined time interval. The user-specified flag may be received at the controller, after input via a graphical user interface.

Preferably, prior to determining if the measurement of ion intensity within a predefined time interval complies with at least one validity criterion, the controller is further configured to apply a smoothing algorithm to the measurement of the ion intensity. Optionally, the smoothing algorithm is a Savitzky-Golay filter.

Preferably, the controller is configured to terminate supply into the mass analyser of the test specimen and any further test specimen of the series of test specimens, comprises the controller configured to control at least one of a group of actions comprising:

preventing input of the test specimen and any further test specimen of the series of test specimens to the mass analyser;

cease a supply of the carrier gas;

cease a supply of the analyte ions;

placing into standby a sample introduction system that is fluidly connected to the mass analyser, and arranged to introduce an analyte; and placing the mass analyser into standby.

Preferably, the carrier gas and/or analyte pass through a chromatograph prior to supplying the test specimen into the mass analyser.

Preferably, the predetermined time interval begins after elapse of a time period associated with the expected time for a component of a sample to travel between a sample source and the detector, the sample component being ionised to generate the analyte ions prior to being supplied into the mass analyser. In other words, the predefined time interval begins after elapse of a time period after introduction of the sample being supplied to the mass analyser. A predetermined time interval is associated with a test specimen, such that each test specimen of the series of test specimens has an associated predetermined time interval.

Preferably, the mass spectrometer is an isotope ratio mass spectrometer.

Preferably, the mass spectrometer comprises a plurality of detectors, arranged in a detector array. Optionally, each of the plurality of detectors is a Faraday collector.

Preferably, the controller is configured to receive a measurement of an ion intensity comprises the controller configured to receive a measurement an ion intensity from each detector of the plurality of detectors, and wherein the controller being configured to determine if at least one validity criterion of the group of validity criteria is complied with, comprises the controller configured to determine, for the measurement of the ion intensity received from each detector of the plurality of detectors, if at least one validity criterion of the group of validity criteria is complied with; and if, for the measurement of the ion intensity received by the controller from each and every detector of the plurality of detectors, none of the validity criteria are complied with, then the controller is configured to terminate supply into the mass analyser the test specimen and any further test specimen of the series of test specimens.

Also described herein is a mass spectrometer comprising the controller described above. The controller may be integral to the mass spectrometer. In an alternative, the controller is in communication with the components of the mass spectrometer.

Any characteristic, alternative or benefit described above with respect to a feature of the method will be understood to apply equally to a corresponding feature of the controller.

A method for controlling a mass spectrometer as described can be applied to various types of mass spectrometer. In a particular example, the method is applied within an isotope ratio mass spectrometer (IRMS) system, in which an isotope ratio mass spectrometer is used in conjunction with a combustion or pyrolysis device and a liquid or gas chromatograph. The method is controlled by a controller connected to each element of the system.

A typical IRMS system is formed of four main sections: a sample introduction system, a sample preparation system, a mass spectrometer (including an ionisation source, a magnetic sector mass analyser, and one or more ion detectors), and a controller. FIG. 1 shows a highly schematic arrangement of a typical IRMS system 100.

The sample introduction system 10 is used to prepare a sample (for instance, a solid or liquid sample) into the preferred state for onward measurement (for instance, transformed to a liquid or gas phase). In an example, a user of the apparatus may place a sample 5 in an autosampler (not shown in FIG. 1) of the sample introduction system 10. The autosampler may introduce the sample to a combustion furnace or pyrolysis device (not shown in FIG. 1) of the sample introduction system 10. Here, the sample may be heated in order to be changed to a gas or liquid phase, as appropriate for the onward process. A carrier gas (for instance, helium gas), supplied to the sample introduction system 10 from a carrier gas source 15, may be used to move the sample in the gas or liquid phase towards the next section, which is a sample preparation system 20. Flow of the carrier gas may be regulated by a valve 12, for instance.

The carrier gas and sample (or analyte) may together constitute a test specimen, to be passed through the mass spectrometer for analysis.

The sample preparation system 20 splits the sample into atoms, molecules and/or smaller compounds, prior to passing to the mass spectrometer 30. There are two main techniques for sample preparation in an IRMS system. These include elemental analysis for the whole sample (EA-IRMS) or separation of the chemical substances of the sample into atoms, molecules and/or molecularly smaller compounds by gas chromatography (GC-IRMS). Liquid chromatography (LC-IRMS) has also been explored for sample preparation but is less commonly used. As such, the sample preparation section 20 comprises a chromatograph, and in some cases may include a reduction furnace, chemical trap and/or moisture trap (none of these specific elements are shown within the sample preparation system 20 of FIG. 1). The sample atoms, molecules or compounds are passed form the sample preparation system 20 to the mass spectrometer 30, carried by the carrier gas.

The separated analyte (or sample) atoms, molecules or compounds, carried by and together with the carrier gas, comprise a test specimen. The test specimen is passed through the mass spectrometer 30 for analysis. Specifically, components of the test specimen are ionised in an ionisation source 35 of the mass spectrometer. The ionised components of the specimen (including the sample ions) are passed through a magnetic sector mass analyser 40, where the ions separate in space according to their mass-to-charge ratios. The resulting spatially separated ion species are detected at a plurality of Faraday detectors in a detector array 45. In an alternative, only a single detector could be used. In addition to so-called Faraday cups or detectors, several types of ion detectors are known, for example compact discrete dynodes (CDDs) and secondary electron multipliers (SEMs). In some mass spectrometers, a plurality of Faraday detectors is combined with one or two other types of ion detectors, the Faraday detectors being used for ions occurring in larger quantities and the other type(s) of ion detector being used for ions occurring in smaller quantities.

A controller 50 is electrically connected to each element 15, 10, 20, 30 within the IRMS system 100. As such, instructions or data can be passed between the controller 50 and each element 15, 10, 20, 30. The controller 50 may form part of a computer controlled data acquisition system, and may receive a signal from each detector of the array of detectors 45. The signal represents the intensity of ions received at each detector.

It is noted that measurements within the system may be a measurement of an analyte, or may be a 'blank' measurement. Where an analyte is measured, this may be a sample analyte to be analysed (of unknown components or isotopic ratios) or may be a reference analyte (of known components or isotopic ratios). The reference analyte may be a reference material for stable isotope analysis (such as an isotopic standard, for example Vienna Standard Mean Ocean Water (VSMOW)). Comparison of measurements of a reference analyte with a sample analyte allows identification of the sample component and isotopic ratios. In these measurements, the test specimen may comprise the sample or reference analyte, as well as the carrier gas).

In comparison, a 'blank' measurement is one in which no specific analyte is added to the system (and so the test specimen may comprise only the carrier gas and any inherent contaminants). A 'blank' measurement measures background impurities or contamination inherent in the system (for example, from the apparatus itself, the chemical treatment of samples, the sample capsules in which the sample is input to the system, or even the carrier gases used). Effects of such contaminants will be visible in the measurement of an analyte and cannot be removed, but must be accounted for. Such effects will often be seen as a background or baseline within the ion intensity when measuring an analyte. A 'blank' measurement (i.e. a measurement without the analyte present, for instance using empty or blank sample capsules) therefore provides a direct measurement of the intrinsic background or baseline of a measurement within an IRMS system. After measurement of an analyte, an associated 'blank' measurement can be used in post-measurement data processing to subtract or account for this background or baseline. It will be understood that 'blank' measurements may be made before, between or after different analytes or samples are measured within the IRMS system.

Techniques for sample introduction and sample preparation in an IRMS system 100 as well as for ionization, separation and detection in the mass spectrometer of the IRMS system will be familiar to the skilled reader. The details of the sample introduction system, sample preparation system, and mass spectrometer of the IRMS system 100 do not in any event form a part of the present invention, and will not be discussed further in any detail. Instead, the present invention relates to the controller 50 of the IRMS system 100, and the method of controlling the IRMS system 100.

Figure 2:
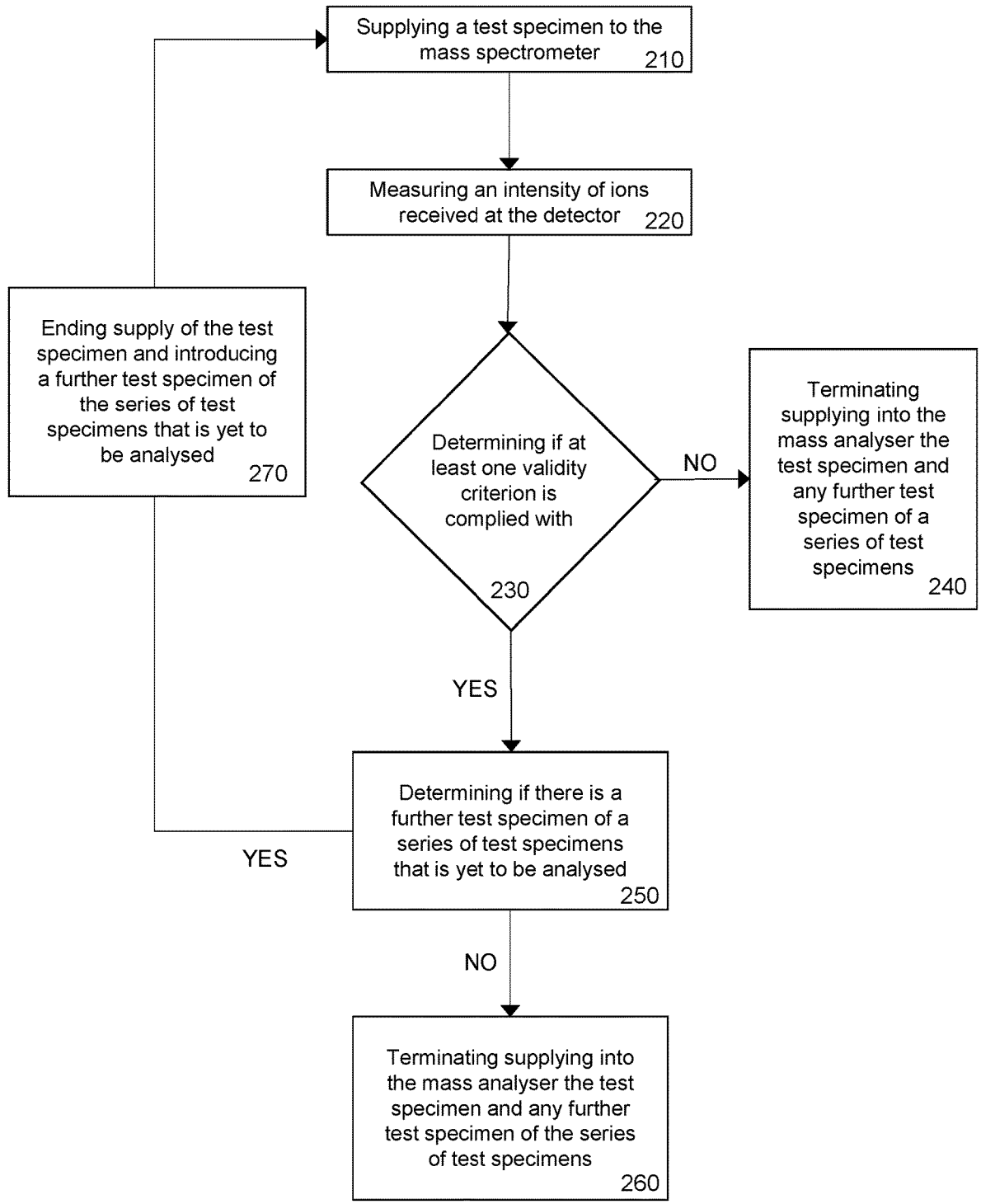
FIG. 2 is a flow diagram showing a method implemented by a controller of a system for isotope ratio mass spectrometry (IRMS)

FIG. 2 shows a flow chart illustrating steps of a method for controlling a mass spectrometer. The steps of the method may be carried out by a controller. In a specific example, the controller 50 of the IRMS system 100 (such as described above) may be configured to cause the various elements of the IRMS system to together perform the steps of the described method.

A test specimen (comprising the sample and/or carrier gas) may be supplied to or flowed through the mass spectrometer of the system (step 210) and into a mass analyser. The supply of the test specimen is controlled by the controller, for instance by control of a valve or shutter within the flow pathway of the carrier gas or sample through the apparatus. The controller may also control the combustion of a sample in the sample introduction system of an IRMS system, or control the operation of the autosampler, thereby controlling the introduction or supply of the test specimen through the mass spectrometer to the mass analyser. The test specimen is one of a series of test specimens to be analysed.

The one or more detectors at the mass spectrometer measure an ion intensity received at the detector over a period of time for the measurement (step 220). In other words, the detector measures the charge at the detector over a time period, which is indicative of the number (or intensity) of ions received or collected by the detector. Where an array of detectors are present in the mass spectrometer, the controller receives from each detector of the detector array a signal representative of the ion intensity. The controller may save the signal representative of the ion intensity at each detector within a computer memory.

In a next step, the controller determines if the ion intensity measured during a predetermined time interval complies with at least one validity criterion (step 230). The controller may make this determination by analysis of the ion intensity measured within a predetermined time interval associated with the test specimen, as well as any associated data (for example, header data) stored with or presented in association with the measured ion intensity. The at least one validity criterion is at least one of a group of possible validity criteria, as detailed below.

The predetermined time interval is identified from knowledge of previous analysis of test specimens having similar sample ions. In particular, from previous measurements it is possible to identify an expected time taken for sample species to travel through the mass spectrometer system. In an IRMS system, for example, when there are no system faults there will be an expected, predictable time period that will elapse between a particular sample species being introduced to the system (for instance, at the autosampler, or by the combustion of the original solid sample) to the specific sample ions being received at a detector of the system. This will differ for different sample species, which may move through the system at different rates. In an IRMS system, the expected time period will be dependent on the time for specific sample species to combust and/or to move through the chromatograph in the sample preparation section of the IRMS system.

As such, in a measurement of ion intensity over time as received at the detectors, it can be predicted when a peak associated with receipt of a sample ion of interest will be observed. Accordingly, for a given test specimen, where a measurement is undertaken without error, a time interval during which a sample peak should be observed in the ion intensity received at a particular detector can be predicted as a result of knowledge of previous measurements. This time interval is the 'predetermined time interval', and may begin after elapse of a predefined time after the introduction of the sample to the system. Different test specimens in a series of test specimens to be measured would have a respective associated predetermined time interval.

In a specific example, a first validity criterion for the ion intensity measured during a predetermined time interval requires detection of a valid peak. The conditions for a valid peak are discussed in more detail below. In one example, a valid peak is characterised as a detected peak having a maximum greater than a predetermined maximum threshold (i.e. greater than a predefined magnitude). If the controller detects a valid peak within the ion intensity measured during a predefined time interval, then the first validity criterion is met.

In the same specific example, a second validity criterion comprises the determination of a flag associated with the measured ion intensity within the predetermined time interval. The flag is user-specified, preferably in advance of the ion intensity being measured at the detector. The flags may be included within, or input as part of, a measurement sequence (preprogramed to measure a series of test specimens). The user-specified flag may be stored in the result file, for instance recorded in the header of a data file in which the measured ion intensity is stored. The flags optionally may be included in the output of the measurement of the ion intensity to the user.

The user-specified flag is used to indicate the associated measurement is a 'blank' measurement as described above. Blank measurements may be used for calibration, for instance to ascertain a baseline for background impurities within the measurement. Therefore, in a 'blank' measurement the presence or absence of any sample peaks is not relevant to the validity of the measurement, or necessarily an indication of an error or fault in the system. As such, if the controller determines a user-specified flag is associated with a measurement of the ion intensity within the predefined time interval, then the second validity criterion is met.

In the event that none of the validity criteria are met, the controller proceeds to terminate the supply of the test specimen, as well as any further test specimen of the series of test specimens, through the mass analyser (step 240). In other words, the controller ceases the measurement, as it is determined that an error has occurred. Specifically, the controller may close a valve at the carrier gas source to stop the flow of carrier gas (which may in turn prevent movement of the sample from the autosampler to the combustion or pyrolysis device in the sample introduction stage). Alternatively or in addition, the controller may stop combustion and pyrolysis of the sample by placing the combustion or pyrolysis device into standby. Such actions terminate the flow of any test specimen through the mass spectrometer, so as to preserve the samples and prevent wastage of the samples and/or carrier gas. Alternatively or in addition, the controller may place the mass analyser into a standby mode. Alternatively or in addition, the controller may close a valve or shutter at the input to the mass analyser, and/or elsewhere in the system.

In a specific example, steps for termination of the supply of the test specimen (and any further test specimens) at an IRMS system include setting elements of the sample introduction and sample preparation system, as well as the mass analyser, into a standby mode, and closing all valves controlling the input and flow of the carrier gas through the IRMS system. Upon the supply of the test specimen to the mass analyser being terminated (in other words, once a sequence of measurements of the series of test specimens is stopped) then a message may be sent to a user at a user interface (for instance at a computer display), and/or a note may be made in a result log.

If at least one validity criterion is met, a measurement sequence continues. More specifically, the controller determines if a further test specimen of the series of test specimens is yet to be analysed as part of the measurement sequence (step 250). If so, then the supply of the test specimen ends and the further test specimen is introduced (step 270). The method then returns to step 210 (having the further test specimen as the test specimen). The measurement of the further test specimen subsequently proceeds according to steps 210 to 250. Alternatively, if no further test specimen of the series of test specimens is yet to be analysed as part of a measurement sequence, then the measurement sequence ends (step 260). In this case, the controller proceeds to terminate the supply of any test specimen (including closing the flow of carrier gas) and/or shutting down or placing into standby the mass spectrometer and other elements of the apparatus (such as a sample introduction system).

As such, the method allows for sequential measurements of a plurality of test specimens, for instance. The plurality of test specimens (or series of test specimens) may include different types of analytes (such as a sample analyte and then a reference analyte, or even different species of sample analytes, introduced via the sample introduction system for each repetition of the steps of the method). Alternatively, the plurality of test specimens may include further portions of the same sample analyte (being further portions of the same initial sample introduced at the sample introduction system).

Such sequential measurements of a series of test specimens may be considered part of a measurement sequence. Each measurement sequence may be programmed in advance by a user of the system, for instance, in order to automatically and efficiently test a large number of samples (or repeatedly test the same sample). The sequential measurements may measure sample analytes, reference analytes or blank measurements according to a preprogramed sequence, for instance.

Where sequential measurements are made, the above steps of the method are repeated for the measurement of each test specimen, so that a further measurement of the ion intensity is obtained during a predetermined time interval associated with the measurement of each test specimen of the series of test specimens. Where test specimens comprise different analyte ions, a different predetermined time interval may be used for each test specimen (as the predetermined time interval is associated with the time for a particular analyte to travel through the system and reach a detector of the mass spectrometer, and this time may be different for different species or types of analyte). The predetermined time interval may be programmed by the user at the time of programming the measurement sequence, for instance.

Figure 3:
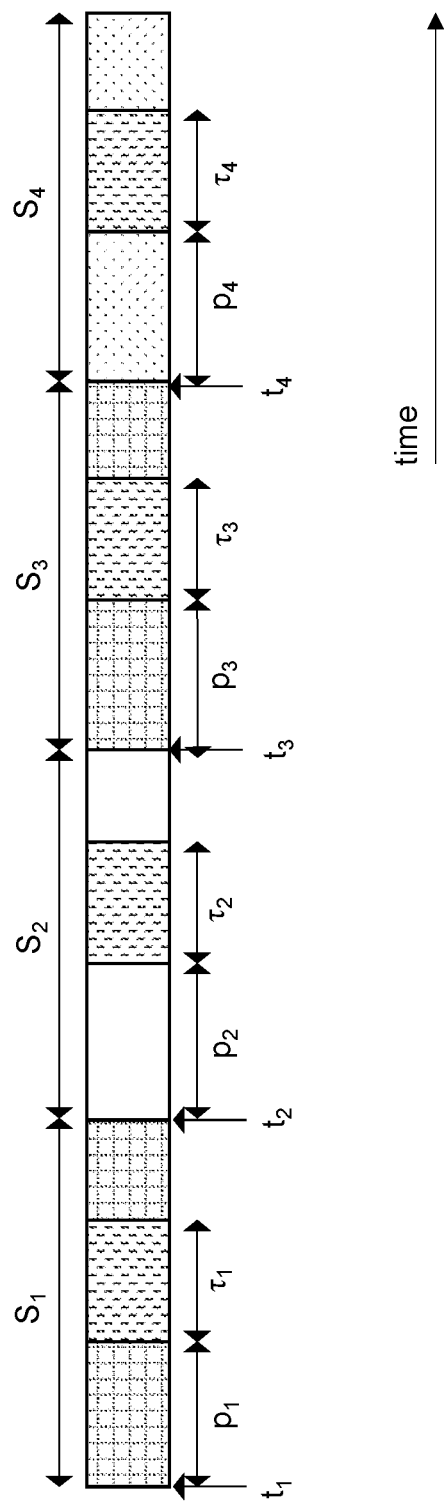
FIG. 3 is a schematic diagram of a measurement sequence, in which a series of four test specimens are measured.

This is illustrated at FIG. 3. In particular, FIG. 3 shows a pictorial representation of the measurement sequence for analysis of a series of four test specimens ($S_1$, $S_2$, $S_3$, $S_4$). In this example, the first ($S_1$) and third ($S_3$) test specimens comprise a sample analyte, the second ($S_2$) test specimen is a 'blank' measurement, and the fourth ($S_4$) test specimen comprises a reference analyte. Each test specimen has an associated predetermined time interval ($\tau_1$, $\tau_2$, $\tau_3$, $\tau_4$, respectively). Each time interval begins after elapse of a time period ($p_1$, $p_2$, $p_3$, $p_4$ respectively) that begins from the time ($t_1$, $t_2$, $t_3$, $t_4$ respectively) after the introduction of the sample into the system if appropriate (for instance, at the autosampler) or in others words after the 'beginning' of the measurement of the given test specimen.

In some cases, the ion intensity may be measured at the detectors throughout the period of measurement of all of the series of test specimens. However, the validity criteria are only considered for the measurement of the ion intensity within the predetermined time interval for each respective test specimen. If, after each predetermined time interval ($\tau_1$, $\tau_2$, $\tau_3$, $\tau_4$) it is determined that none of the validity criteria have been met, then the measurement sequence would be terminated. Therefore, supply of the given test specimen would end, and no further test specimen would be introduced into the system. As such, the sequence could end after the time interval $\tau_1$, for instance, if the measurement of the first test specimen does not yield a valid peak within $\tau_1$, or could end after the time interval $\tau_2$, for instance, if no user-specified flag is identified associated with the 'blank' measurement of the ion intensity during $\tau_2$, and so on.

Beneficially, as the validity criteria are identified during measurement of each test specimen of a measurement sequence measuring a series of test specimens, the method offers a real-time check of errors or faults in the measurement. Therefore, erroneous measurements or faults within the operation of the system can be identified quickly, before significant wastage of analytes both sample and reference) and carrier gases occurs.

The skilled person will understand that the detectors of the mass spectrometer (and more specifically, an IRMS) may contain a plurality of detectors arranged in an array. For each test specimen, each measurement of ion intensity at each detector may have different associated predetermined time interval (which is based on a time for a specific sample ion, expected to be received at the given detector of the detector array, to reach the detector array after initiation of the measurement sequence). In a preferred example, for each test specimen, the measured ion intensity at one or more of the detectors of the detector array must be determined to comply with at least one validity criterion in order to continue with the supply of the test specimen through the mass spectrometer. However, in an alternative example, for each test specimen the measured ion intensity at a predefined proportion of the detectors within the detector array must be determined to comply with at least one validity criterion in order to continue with the supply of the test specimen through the mass spectrometer. In another alternative example, for each test specimen the measured ion intensity at all of the detectors within the detector array must be determined to comply with at least one validity criterion in order to continue with the supply of the test specimen through the mass spectrometer.

With respect to the first validity condition described above, a number of conditions may be applied to determine whether a peak detected in the ion intensity within a predetermined time interval, $\tau_{int}$, is a valid peak. More specifically, in order to meet the first validity criterion that a valid peak is detected in the measured ion intensity during the predetermined time interval, $\tau_{int}$, the detected peak must comply with one or more of the following conditions:

1. The maximum of the detected peak must be greater than a predetermined maximum threshold, $T_M$;
2. Both the start and the end of the peak must fall within the predetermined time interval, $\tau_{int}$;
3. The detected peak must have a width at half-maximum that is within a predetermined range of values for the peak width;
4. The area under the peak must be within a predetermined range of values for the area; and
5. The detected peak must have a typical peak shape, detected by considering a factor of the peak area (in other words, the area under the peak), the peak width and the peak height. In particular, where a calculated peak shape factor, $F_s$, is greater than a given peak shape threshold, $T_s$, the peak is considered to be a 'square' peak (and so of atypical shape). Here, $$F_s = \frac{\text{Peak area/Peak width}}{\text{Peak height}}$$

Further criteria for a valid peak may include a peak resolution parameter, which controls the resolving of overlapping peaks in the measured ion intensity. In particular, if the signal (having reached a maximum) then falls below a predefined peak resolution threshold but subsequently begins to rise again, the previously detected peak may be considered to have ended and a new detected peak may be considered to have started. This represents a form of valley detection, which can be used for detection of overlapping peaks.

In a particular example, in order for the detected peak to be a valid peak it must comply with one or more of conditions 2 to 5 above in addition to compliance with condition 1. However, in another example, the detected peak may be considered a valid peak upon compliance with any one of the above conditions, or any combination of two or more of the conditions.

Figure 4:
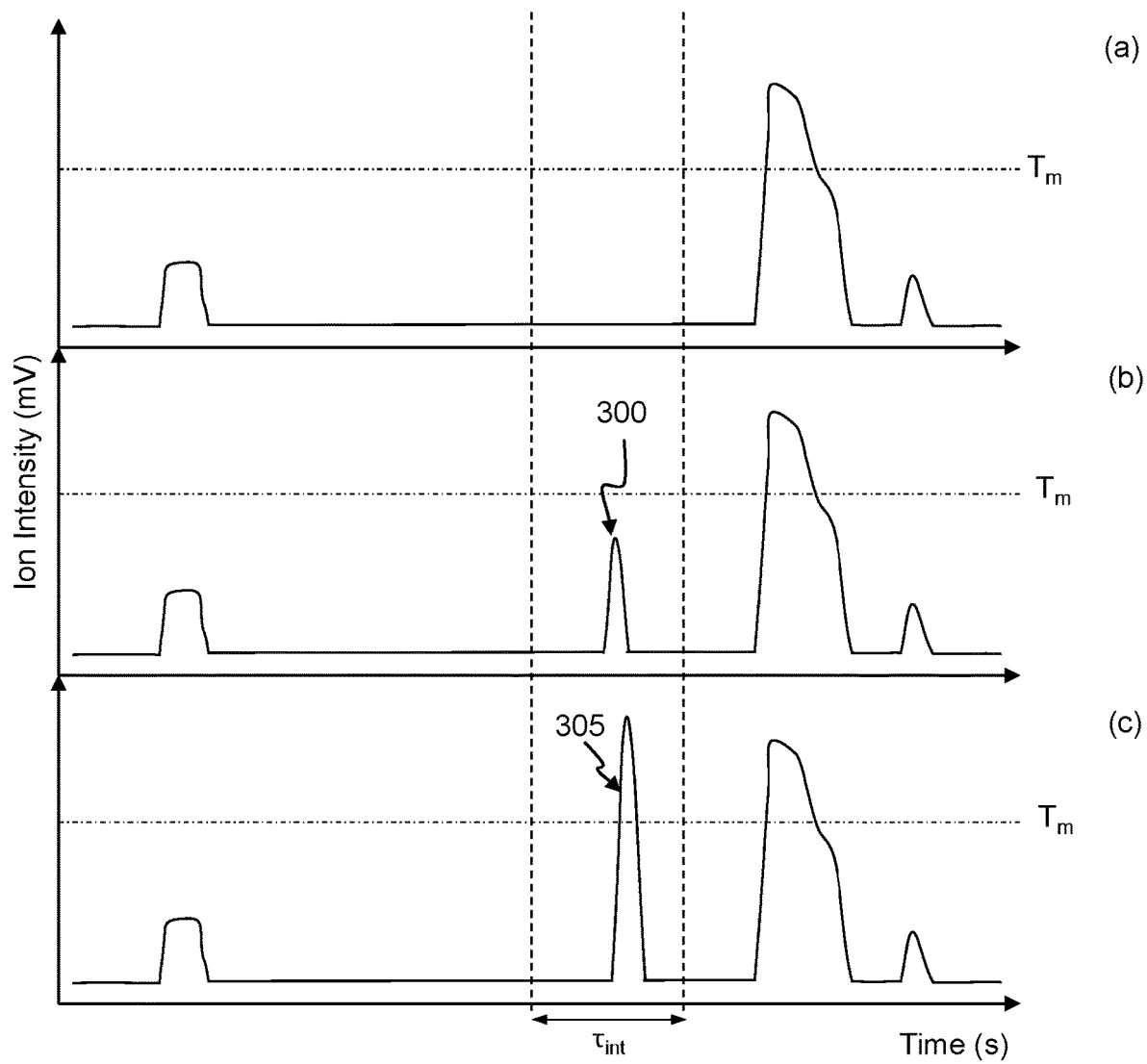
FIG. 4 shows schematic representations of traces of ion intensity measured at a detector of a mass spectrometer, which variously comply or do not comply with a first validity criterion when applying a first condition for a valid detected peak.

FIGS. 4(a), (b) and (c) show schematic examples of traces of measured ion intensity at a detector. Various peaks are shown in the traces. The traces represent possible measurement outcomes for measurements of the same sample or test specimen. A predetermined time interval, $\tau_{int}$, is marked on each of FIGS. 4(a), (b) and (c). A predetermined maximum threshold, $T_M$, is also marked. In an ideal measurement, a peak associated with the sample ion of interest would be expected within the predetermined time interval, $\tau_{int}$. The other peaks result from ions of other components within the test specimen, which are not the specific sample ion of interest.

In order to comply with the first validity criterion described above, a valid peak must be detected in the trace within the predetermined time interval, $\tau_{int}$. In accordance with the first condition for a valid peak, the detected peak must also have a maximum that is greater than the predetermined maximum threshold, $T_M$. In view of this condition, no valid peak is detected in the trace at FIG. 4(a) or 4(b). In the case of FIG. 4(a), no peak is detected at all within the predetermined time interval, $\tau_{int}$. However, in the case of FIG. 4(b), although a peak 300 is detected within the predetermined time interval, $\tau_{int}$, the maximum of the peak is less that the predetermined maximum threshold, $T_M$. Therefore assuming no other validity criterion is complied with by measurements of the ion intensity represented in FIGS. 4(a) and 4(b) (specifically, no user-specified flag associated with the ion intensity measured within the predetermined time interval is determined), then the controller terminates the supply of the test specimen (and any further test specimen) through the mass spectrometer.

In contrast, FIG. 4(c) demonstrates a valid peak, which would comply with the first validity criterion. This is because peak 305 is detected within the predetermined time interval, $\tau_{int}$, and has a maximum that is greater than the predetermined maximum threshold, $T_M$. As such, the controller would allow continuation of the supply of the test specimen (and further test specimen of the series of test specimens) through the mass spectrometer upon receipt and analysis of the trace in FIG. 4(c).

Figure 5:
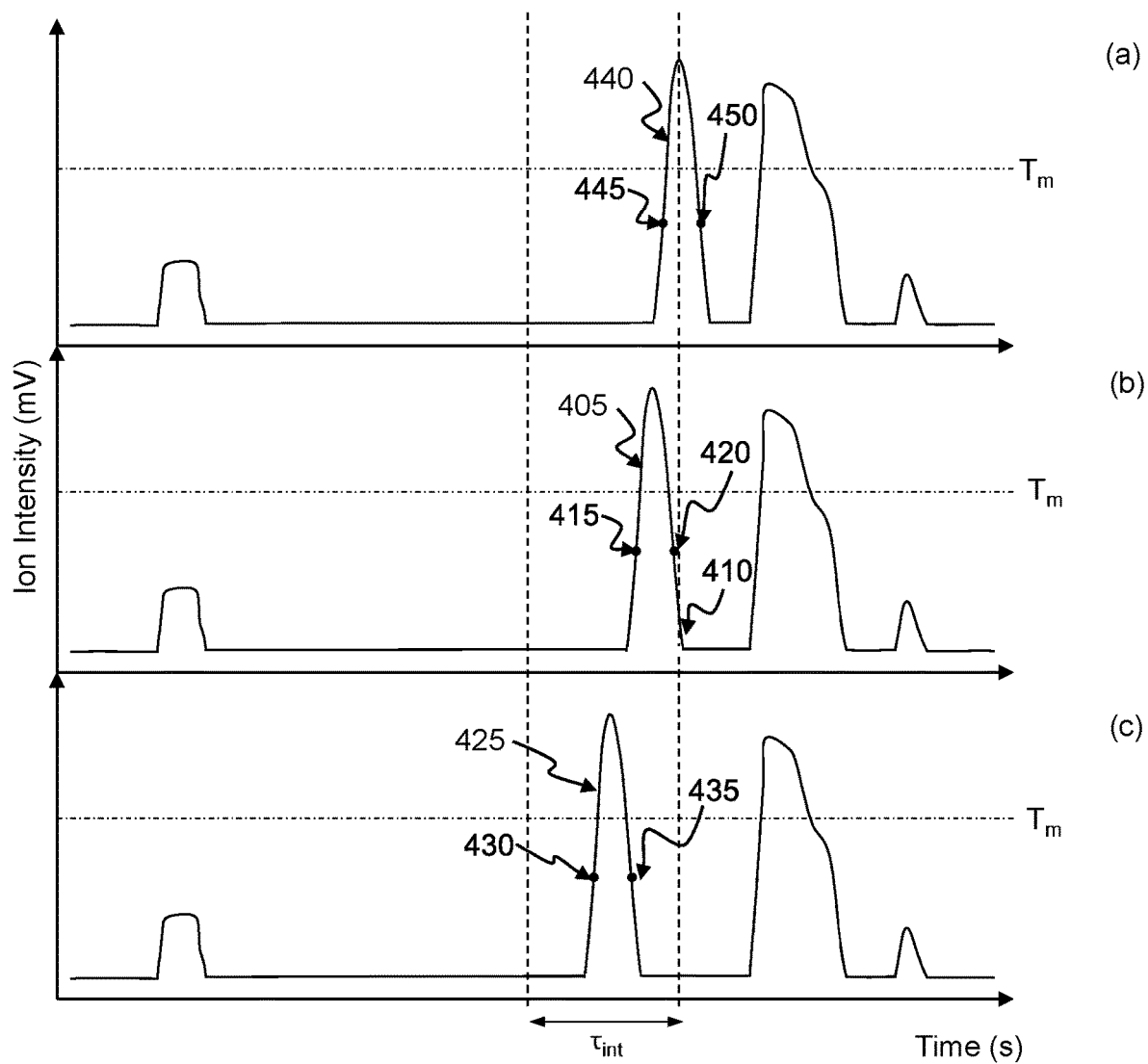
FIG. 5 shows schematic representations of traces of ion intensity measured at a detector of a mass spectrometer, which variously comply or do not comply with the first validity criterion when applying a second condition for a valid detected peak.

FIGS. 5(a), 5(b) and 5(c) show schematic examples of traces of measured ion intensity at a detector. Various peaks are shown in the traces. The traces represent possible measurement outcomes for measurements of the same sample. A predetermined time interval, $\tau_{int}$, is marked on each of FIGS. 5(a), 5(b) and 5(c). A predetermined maximum threshold, $T_M$, is also marked.

In order to comply with the first validity criterion described above, a valid peak must be detected in the trace within the predetermined time interval, $\tau_{int}$. In accordance with the second condition for a valid peak, the detected peak must have a start and end of the peak within the predetermined time interval, $\tau_{int}$. The characteristics of the start and end of the peak may be predefined by a user, but in an example the start and end position represent the position within the trace at 40% of the maximum of the detected peak on the respective upward and downward slope of the peak.

In view of the second condition, valid peaks are detected in the trace of each of FIGS. 5(b) and 5(c). FIG. 5(b) shows a detected peak 405, where the tail of the peak 410 is outside of the predetermined time interval, $\tau_{int}$, but the designated start 415 and end 420 of the peak are within the predetermined time interval, $\tau_{int}$. FIG. 5(c) shows a detected peak 425, where the whole of the peak, including the designated start 430 and end 435 of the peak are within the predetermined time interval, $\tau_{int}$. Accordingly, after analysis of the traces of measured ion intensity FIGS. 5(b) and 5(c), the controller would continue to allow supply of the test specimen (and any further test specimen) through the mass spectrometer.

However, the peak 440 detected in FIG. 5(a) is not valid, as only the first half of the peak (in other words, the portion prior to the maximum of the peak) falls within the predetermined time interval, $\tau_{int}$. As such, the designated start 445 and end 450 of the peak are not both within the predetermined time interval, $\tau_{int}$. This may result from a delay in the sample ions reaching the detector, for instance, and so be indicative of a partial blockage in the system. In any case, as no valid peak is detected in the trace of FIG. 5(a), upon receipt and analysis of this trace the controller terminates the supply of the test specimen (and any further test specimen) through the mass spectrometer.

Figure 6:
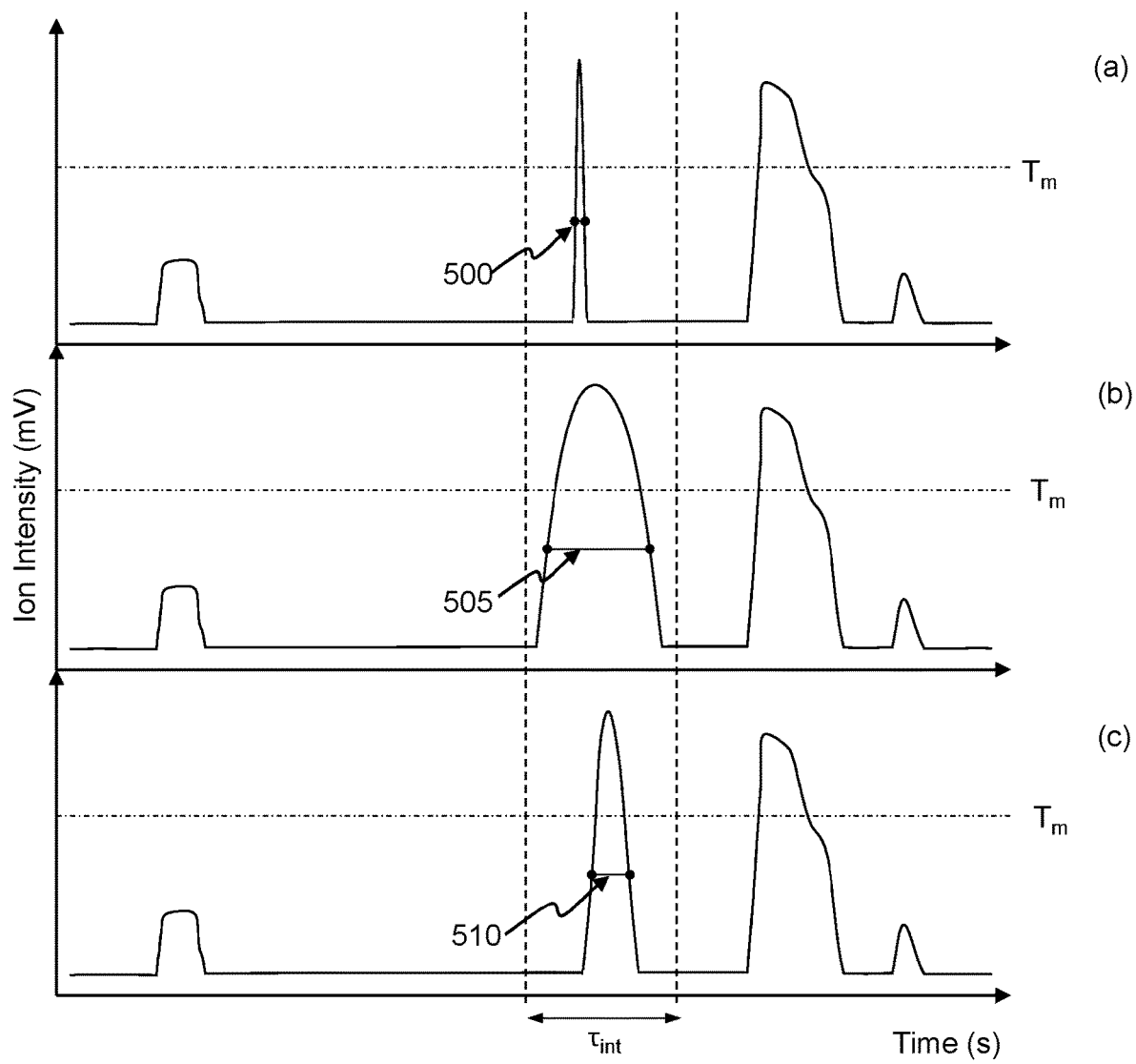
FIG. 6 shows schematic representations of traces of ion intensity measured at a detector of a mass spectrometer, which variously comply or do not comply with the first validity criterion when applying a third condition for a valid detected peak.

FIGS. 6(a), 6(b) and 6(c) show schematic examples of traces of measured ion intensity at a detector. Various peaks are shown in the traces. The traces represent possible measurement outcomes for measurements of the same sample. A predetermined time interval, $\tau_{int}$, is marked on each of FIGS. 6(a), 6(b) and 6(c). A predetermined maximum threshold, $T_M$, is also marked.

In order to comply with the first validity criterion described above, a valid peak must be detected in the trace within the predetermined time interval, $\tau_{int}$. In accordance with the third condition for a valid peak, the detected peak must have a width at half-maximum that is within a predetermined range of values for the peak width.

In view of the third condition, valid peaks are detected in the trace of FIG. 6(c), but not in the traces of FIG. 6(a) or 6(b). In particular, the peak detected within the predetermined time interval, $\tau_{int}$, in FIG. 6(a) has a width at half-maximum 500 that is less than the lower boundary of a predetermined range of values for the peak width. The peak detected within the predetermined time interval, $\tau_{int}$, in FIG. 6(b) has a width at half-maximum 505 that is greater than the upper boundary of a predetermined range of values for the peak width. As such, the width at half maximum for the peaks detected within the predetermined time interval, $\tau_{int}$, in FIG. 6(a) or 6(b) are outside of a predetermined range of values for the peak width. Upon receipt and analysis of these traces, the controller would terminate the supply of the test specimen (and any further test specimen) through the mass spectrometer.

In contrast, the peak detected within the predetermined time interval, $\tau_{int}$, in FIG. 6(c) has a width at half-maximum 510 that is within the predetermined range of values for the peak width. Consequently, after receipt and analysis of this trace, the controller would continue to allow supply of the test specimen (and further test specimen) through the mass spectrometer.

Figure 7:
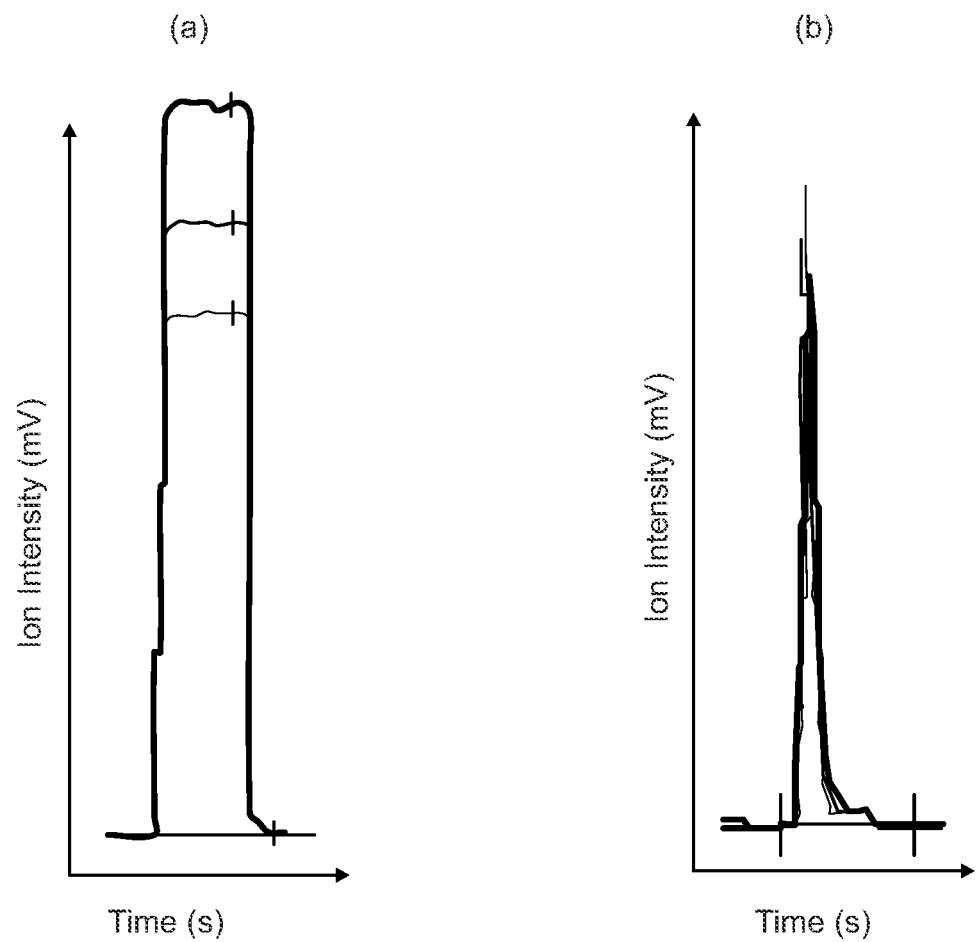
FIG. 7 shows plots of peaks in measured ion intensity, wherein the peaks are identified as 'square' peaks or otherwise.

FIGS. 7(a) and 7(b) show examples of traces of measured ion intensity at a detector. In both cases, the peaks shown would have been detected within the predetermined time interval, $\tau_{int}$. However, in accordance with the fifth condition for a valid peak, the detected peak must have an appropriate peak shape (and in particular, it should not be a 'square' peak).

The peak shape may be evaluated by calculation of a peak shape factor, $F_s$, wherein $$F_s = \frac{\text{Peak area/Peak width}}{\text{Peak height}}.$$

Where the calculated peak shape factor, $F_s$, is greater than a given peak shape threshold, $T_s$, the peak is considered to be a 'square' peak. In a particular example, the peak shape threshold, $T_s$, value may be 0.55, although any value in the range 0.3 to 0.7 (or more preferably 0.5 to 0.6) could be used.

In the specific example of the peak shown in FIG. 7(a) (in which the peak area is 79061, the peak width 26.5 s, and the peak height 4046 mV) then the calculated peak shape factor, $F_s$, is 0.74. As such, this would be determined to be a square peak, and so not of a typical peak shape. Consequently, the peak shown in FIG. 7(a) would not be considered a valid peak (and so would not meet the first validity criterion).

Upon receipt and analysis of this peak in the predetermined interval, the controller would terminate the supply of the test specimen (and any further test specimen) through the mass spectrometer.

In the specific example of the peak shown in FIG. 7(b) (in which the peak area is 3918, the peak width 22.8 s, and the peak height 1303 mV) then the calculated peak shape factor, $F_s$, is 0.13. As such, this would be determined not to be a square peak but to have a typical peak shape. Consequently, the peak shown in FIG. 7(b) would be considered a valid peak (and so would meet the first validity criterion). As such, upon receipt and analysis of this trace, the controller would allow the measurement sequence to continue.

Analysis of the peak shape in this way may be useful to computationally identify an atypical peak shape (in particular, a peak which is too 'square'), which may indicate a fault in the apparatus or the measurement of a test specimen.

The above-described method is implemented as a set of computer program instructions, stored at a memory connected to, or that forms part of, the controller. The computer program instructions, when executed at a processor of the controller, cause the elements of the mass spectrometer system to act in accordance with the method. Various of the conditions described above for peak detection require predefined thresholds or ranges to be used, in comparison to the value determined from the measurement of the ion intensity and any detected peak therein. These ranges may be predefined in software stored and implemented at a processor of the controller. However, in other cases, the ranges may be input to the software by the user. FIG. 8 shows an example of a control box which can be shown to the user (via a Graphical User Interface), through which the user can input chosen values for each range, threshold or other parameter.

Peak detection within the measurement of the ion intensity can be achieved using any standard peak detector (such as that published within OpenMS, https://www.openms.de/, accessed 11 Sep. 2020). In one example, a peak is detected according to the gradient. For instance, a peak is detected when a positive gradient of more than a predetermined (scalar) magnitude is identified in the trace for at least a predefined time period, followed by a negative gradient of more than a predetermined (scalar) magnitude identified in the trace for at least a predefined time period. This could also be interpreted as detection of a peak when a positive slope is identified between a given number of consecutive measurement points, followed by a negative slope identified between a given number of consecutive measurement points. In the example control box at FIG. 8, it can be seen that the user can set the predetermined (scalar) magnitudes for the required positive and negative gradients used in the peak detection.

Figure 9:
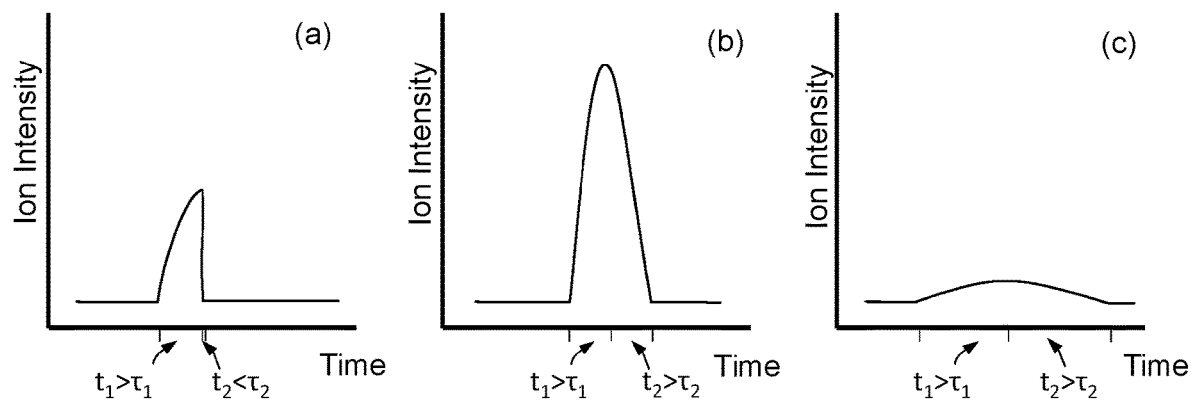
FIG. 9 shows schematic representations of peaks in ion intensity which will or will not be detected by the described peak detection algorithm.

FIGS. 9(a), 9(b) and 9(c) shows schematic examples of different shaped peaks in the data. In the gradient-based peak detection described above, only the feature in FIG. 9(b) would be detected as a peak. This is because the peak feature in FIG. 9(b) demonstrates a sufficient positive gradient for more than a required period $\tau_1$, followed by a sufficient negative gradient for more than a required period $\tau_2$. In contrast, FIG. 9(a) shows a feature that has a sufficient negative gradient but for less than the required period $\tau_2$. Furthermore, FIG. 9(c) shows a broad and low feature, which does not demonstrate a sufficient positive or negative gradient to be detected as a peak.

In view of the sensitivity of the peak detection algorithms employed, there is a risk that noisy measurements of the ion intensity could cause features in the ion intensity which are representative of a received sample ion not to be properly detected as peaks. Alternatively, peaks may be incorrectly detected and attributed to receipt of sample ions that are instead the result of noise. Such errors can be reduced by applying a smoothing algorithm to the measured ion intensity prior to determination whether at least one validation criterion is met. Application of a smoothing algorithm provides a trace identifying the underlying peaks, features and trends in the measured ion intensity.

Figure 10:
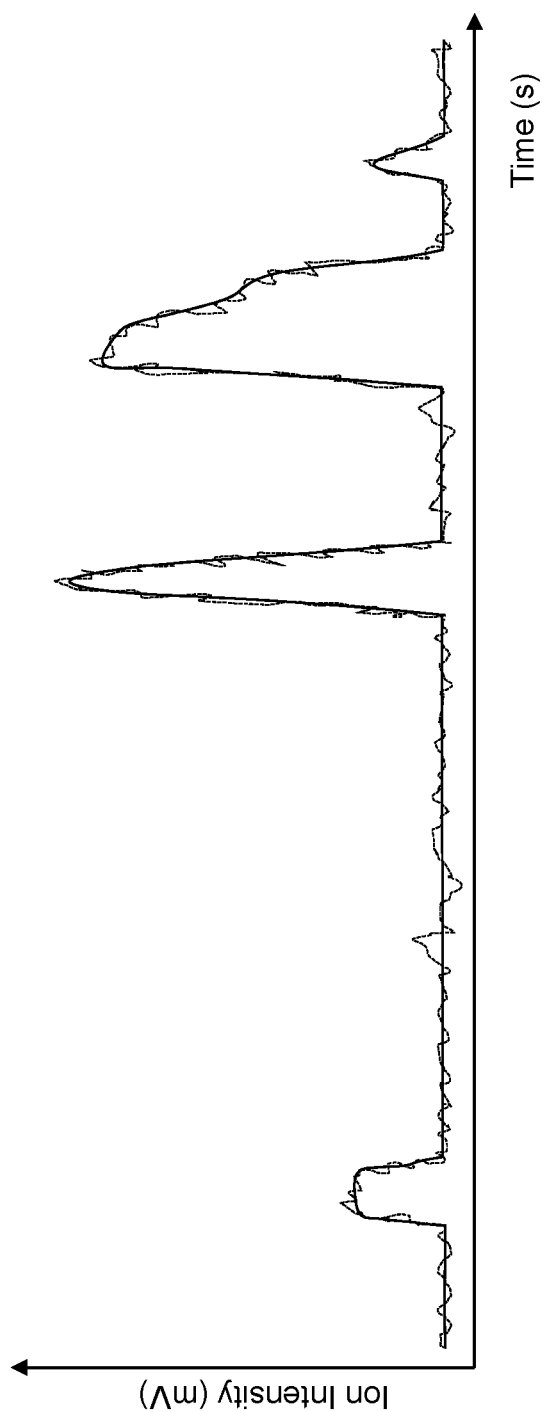
FIG. 10 shows a schematic representation of traces of ion intensity measured at a detector of a mass spectrometer upon which a smoothing algorithm is applied.

As an example, FIG. 10 shows a noisy measurement of the ion intensity (dashed line), with an overlaid trace of the smoothed data (solid line). In a particularly advantageous example, the data can be smoothed using a Savitzky-Golay filter or algorithm. This filter smooths the data whilst also not shifting the signal on the time axis. As such, the original start and end points are maintained, which is helpful to identify whether a detected peak meets a condition to be a valid peak, according to the conditions discussed above.

The method described with reference to FIGS. 2 to 10 considers a measurement of ion intensity at a single detector. In some IRMS systems, as described in FIG. 1 above, a plurality of detectors may be used within the system. In this case, at step 230 of FIG. 2, in which it is determined if the measurement of the ion intensity complies with at least one validity criterion, this step instead requires that the controller determine if, for a given test specimen, the measurement of the ion intensity at each detector complies with at least one validity criterion. In other words, for the measurement at each detector, the controller checks if a valid peak is detected, or if a user-specified flag is identified. The supply of the test specimen (and any further test specimen) to the mass analyser is then terminated if none of the validity criteria are complied with in any of the measurements (received from any of the detectors). If at least one validity criterion is complied with in a measurement of ion intensity from at least one of the detectors, then the supply of a test specimen (and any further test specimen as part of a measurement sequence) is allowed to continue.

As previously noted, the controller will comprise at least a processor and associated computer-readable storage medium or memory. As discussed herein, a computer-readable storage medium or memory refers to a physical storage medium (e.g., volatile or non-volatile memory device) within a computing device. The described method will be performed by the controller upon execution of program instructions stored at the memory and executed on the processor, thereby causing elements of the mass spectrometer instrument connected to the controller to undertake certain steps and perform certain functions. The system further comprises at least one user interface, for receipt of user instructions (including the user-specified flag associated with a measurement during a predefined time interval) by the controller.

Although specific embodiments have now been described, the skilled person will appreciate that various modifications and alterations are possible. All of the features disclosed herein may be combined in any combination, except combinations where at least some of such features and/or steps are mutually exclusive. In particular, the preferred features of the invention are applicable to all aspects of the invention and may be used in any reasonable combination. Likewise, features described in non-essential combinations may be used separately (not in combination).

Sample Embodiments

Sample embodiments are outlined according to the following numbered clauses:

1. A method for controlling a mass spectrometer comprising a mass analyser and a detector, the method comprising:
supplying a test specimen into the mass analyser, to travel through the mass analyser and towards the detector, the test specimen comprising a carrier gas and/or analyte ions, the test specimen being one of a series of test specimens to be analysed;
measuring an ion intensity, the ion intensity representing the intensity of ions within the test specimen received at the detector;
determining if the measurement of the ion intensity complies with at least one validity criterion of a group of validity criteria consisting of:
identification of a valid peak in the ion intensity measured within a predetermined time interval; and
identification of a user-specified flag associated with the ion intensity measured within the predetermined time interval; and
if none of the validity criteria are complied with, then terminating supplying into the mass analyser the test specimen and any further test specimen of the series of test specimens.

2. The method of clause 1, wherein identification of a valid peak in the ion intensity measured within the predetermined time interval comprises detection of a peak in the ion intensity measured within the predetermined time interval 3. The method of clause 2, wherein the detected peak is a valid peak if the detected peak has a maximum that exceeds a predetermined peak maximum threshold.

4. The method of clause 2 or clause 3, wherein the detected peak is a valid peak if the detected peak has a start and end of the peak within the predefined time interval.

5. The method of clause 4, wherein the start of the peak is the position within the rise of the peak at 40% of the peak maximum, and the end of the peak is the position within the fall of the peak at 40% of the peak maximum.

6 The method of any one of clauses 2 to 5, wherein the detected peak is a valid peak if the detected peak has an area under the peak that is between a predetermined upper area threshold and a predetermined lower area threshold.

7. The method of any one of clauses 2 to 6, wherein detecting the peak comprises determining of a positive slope in the ion intensity measured within the predetermined time interval, the positive slope having a gradient of greater than a positive gradient threshold for at least a first time period, and determining of a negative slope in the ion intensity measured within the predetermined time interval, the negative slope having a gradient less than a negative gradient threshold for at least a second time period, subsequent to the first time period.

8. The method of any preceding clause, wherein the user-specified flag indicates that supplying of the test specimen into the mass analyser should not be terminated regardless of the presence or absence of a peak in the ion intensity measured within the predetermined time interval.

9. The method of any preceding clause, wherein the user-specified flag is applied by the user prior to the predetermined time interval.

10. The method of any preceding clause, wherein prior to determining if the measurement of ion intensity within a predefined time interval complies with at least one validity criterion, the method further comprises applying a smoothing algorithm to the measurement of the ion intensity.

11. The method of clause 10, wherein the smoothing algorithm is a Savitzky-Golay filter.

12. The method of any preceding clause, wherein terminating supplying into the mass analyser the test specimen and any further test specimen of the series of test specimens, comprises at least one of a group comprising:
preventing input of the test specimen and any further test specimen of the series of test specimens to the mass analyser;
ceasing a supply of the carrier gas;
ceasing a supply of the analyte ions;
placing into standby a sample introduction system that is fluidly connected to the mass analyser, and arranged to introduce an analyte; and
placing the mass analyser into standby.

13. The method of any preceding clause, further comprising passing the carrier gas and/or analyte through a chromatograph prior to supplying the test specimen into the mass analyser.

14. The method of any preceding clause, wherein the predetermined time interval begins after elapse of a time period associated with the expected time for a component of a sample to travel between a sample source and the detector, the sample component being ionised to generate the analyte ions prior to being supplied into the mass analyser.

15. The method of any preceding clause, wherein the mass spectrometer is an isotope ratio mass spectrometer.

16. The method of clause 15, wherein the mass spectrometer comprises a plurality of detectors, arranged in a detector array.

17. The method of clause 16, wherein each of the plurality of detectors is a Faraday collector.

18. The method of clause 15 or clause 16, wherein measuring an ion intensity comprises measuring an ion intensity at each detector of the plurality of detectors, and wherein determining if the measurement of the ion intensity complies with at least one validity criterion of the group of validity criteria comprises determining, for the measurement of the ion intensity at each detector of the plurality of detectors, if the measurement of the ion intensity complies with at least one validity criterion of the group of validity criteria; and
if, in the measurement of the ion intensity at each and every detector of the plurality of detectors, none of the validity criteria are complied with, then terminating supplying into the mass analyser the test specimen and any further test specimen of the series of test specimens.

19. A controller for connecting to a mass spectrometer, the controller configured to control the method of any one of clauses 1 to 18.

20. A mass spectrometer comprising the controller of clause 19.

The invention claimed is:

1. A method for controlling a mass spectrometer comprising a mass analyser and a detector, the method comprising:
supplying a test specimen into the mass analyser, to travel through the mass analyser and towards the detector, the test specimen comprising a carrier gas and/or analyte ions, the test specimen being one of a series of test specimens to be analysed;
measuring an ion intensity, the ion intensity representing the intensity of ions within the test specimen received at the detector;

determining if at least one validity criterion of a group of validity criteria is complied with, the group of validity criteria consisting of:
- identification of a valid peak in the ion intensity measured within a predetermined time interval; and
- identification of a user-specified flag associated with the predetermined time interval; and if none of the validity criteria are complied with, then terminating supplying into the mass analyser the test specimen and any further test specimen of the series of test specimens.

2. The method of claim 1, wherein identification of a valid peak in the ion intensity measured within the predetermined time interval comprises detection of a peak in the ion intensity measured within the predetermined time interval.

3. The method of claim 2, wherein the detected peak is a valid peak if the detected peak has a maximum that exceeds a predetermined peak maximum threshold.

4. The method of claim 2, wherein the detected peak is a valid peak if the detected peak has a start and end of the peak within the predefined time interval.

5. The method of claim 4, wherein the start of the peak is the position within the rise of the peak at 40% of the peak maximum, and the end of the peak is the position within the fall of the peak at 40% of the peak maximum.

6. The method of claim 2, wherein the detected peak is a valid peak if the detected peak has an area under the peak that is between a predetermined upper area threshold and a predetermined lower area threshold.

7. The method of claim 2, wherein detecting the peak comprises determining of a positive slope in the ion intensity measured within the predetermined time interval, the positive slope having a gradient of greater than a positive gradient threshold for at least a first time period, and determining of a negative slope in the ion intensity measured within the predetermined time interval, the negative slope having a gradient less than a negative gradient threshold for at least a second time period, subsequent to the first time period.

8. The method of claim 1, wherein the user-specified flag indicates that supplying of the test specimen into the mass analyser should not be terminated regardless of the presence or absence of a peak in the ion intensity measured within the predetermined time interval.

9. The method of claim 1, wherein the user-specified flag is applied by the user prior to the predetermined time interval.

10. The method of claim 1, wherein prior to determining if at least one validity criterion is complied with, the method further comprises applying a smoothing algorithm to the measurement of the ion intensity.

11. The method of claim 10, wherein the smoothing algorithm is a Savitzky-Golay filter.

12. The method of claim 1, wherein terminating supplying into the mass analyser the test specimen and any further test specimen of the series of test specimens, comprises at least one of a group comprising:
- preventing input of the test specimen and any further test specimen of the series of test specimens to the mass analyser;
- ceasing a supply of the carrier gas;
- ceasing a supply of the analyte ions;
- placing into standby a sample introduction system that is fluidly connected to the mass analyser, and arranged to introduce an analyte; and
- placing the mass analyser into standby.

13. The method of claim 1, further comprising passing the carrier gas and/or analyte through a chromatograph prior to supplying the test specimen into the mass analyser.

14. The method of claim 1, wherein the predetermined time interval begins after elapse of a time period associated with the expected time for a component of a sample to travel between a sample source and the detector, the sample component being ionised to generate the analyte ions prior to being supplied into the mass analyser.

15. The method of claim 1, wherein the mass spectrometer is an isotope ratio mass spectrometer.

16. The method of claim 15, wherein the mass spectrometer comprises a plurality of detectors, arranged in a detector array.

17. The method of claim 16, wherein each of the plurality of detectors is a Faraday collector.

18. The method of claim 15, wherein measuring an ion intensity comprises measuring an ion intensity at each detector of the plurality of detectors, and wherein determining if at least one validity criterion of the group of validity criteria is complied with, comprises determining, for the measurement of the ion intensity at each detector of the plurality of detectors, if at least one validity criterion of the group of validity criteria is complied with; and
- if, for the measurement of the ion intensity at each and every detector of the plurality of detectors, none of the validity criteria are complied with, then terminating supplying into the mass analyser the test specimen and any further test specimen of the series of test specimens.

19. A controller for connecting to a mass spectrometer having a detector and a mass analyzer, the controller configured to:
- supply a test specimen into the mass analyser, to travel through the mass analyser and towards the detector, the test specimen comprising a carrier gas and/or analyte ions, the test specimen being one of a series of test specimens to be analysed;
- measure an ion intensity, the ion intensity representing the intensity of ions within the test specimen received at the detector;
- determine if at least one validity criterion of a group of validity criteria is complied with, the group of validity criteria including:
  - identification of a valid peak in the ion intensity measured within a predetermined time interval; and
  - identification of a user-specified flag associated with the predetermined time interval; and
- if none of the validity criteria are complied with, then terminate supplying into the mass analyser the test specimen and any further test specimen of the series of test specimens.

20. A mass spectrometer having a controller, a detector, and a mass analyser, and the controller is configured to:
- supply a test specimen into the mass analyser, to travel through the mass analyser and towards the detector, the test specimen comprising a carrier gas and/or analyte ions, the test specimen being one of a series of test specimens to be analysed;
- measure an ion intensity, the ion intensity representing the intensity of ions within the test specimen received at the detector;
- determine if at least one validity criterion of a group of validity criteria is complied with, the group of validity criteria including:
  - identification of a valid peak in the ion intensity measured within a predetermined time interval; and identification of a user-specified flag associated with the predetermined time interval; and if none of the validity criteria are complied with, then terminate supplying into the mass analyser the test specimen and any further test specimen of the series of test specimens.

\* \* \* \* \*